(12) United States Patent
Balani et al.

(10) Patent No.: US 8,719,770 B2
(45) Date of Patent: May 6, 2014

(54) VERIFYING PROGRAMMING ARTIFACTS GENERATED FROM ONTOLOGY ARTIFACTS OR MODELS

(75) Inventors: Naveen G. Balani, Mumbai (IN); Mohan G. Shenoy, Mumbai (IN); Vikas S. Kokare, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 12/878,587

(22) Filed: Sep. 9, 2010

(65) Prior Publication Data

US 2012/0066661 A1    Mar. 15, 2012

(51) Int. Cl.
*G06F 9/44*    (2006.01)
(52) U.S. Cl.
USPC .......... 717/104; 717/106; 717/108; 717/126; 717/143
(58) Field of Classification Search
CPC ............... G06F 8/10; G06F 8/20; G06F 8/24
USPC .......... 717/101–178; 719/315–328; 707/794, 707/810; 706/1–934
See application file for complete search history.

(56) References Cited

U.S. PATENT DOCUMENTS

| | | | |
|---|---|---|---|
| 6,199,195 B1 | 3/2001 | Goodwin et al. | |
| 6,389,434 B1 * | 5/2002 | Rivette et al. | 715/209 |
| 6,560,769 B1 | 5/2003 | Moore et al. | |
| 6,640,231 B1 * | 10/2003 | Andersen et al. | 1/1 |
| 7,146,399 B2 * | 12/2006 | Fox et al. | 709/203 |
| 7,424,701 B2 * | 9/2008 | Kendall et al. | 717/105 |
| 7,516,155 B2 * | 4/2009 | Ivan et al. | 1/1 |
| 7,921,065 B2 * | 4/2011 | Kim et al. | 706/12 |
| 8,065,655 B1 * | 11/2011 | Deo et al. | 717/106 |
| 8,112,257 B2 * | 2/2012 | Weber et al. | 703/6 |
| 8,156,508 B2 * | 4/2012 | Tommasi et al. | 719/328 |
| 8,209,672 B2 * | 6/2012 | Ivanov | 717/136 |
| 2004/0093344 A1 * | 5/2004 | Berger et al. | 707/102 |
| 2004/0216030 A1 * | 10/2004 | Hellman et al. | 715/500 |
| 2006/0048093 A1 * | 3/2006 | Jain et al. | 717/104 |

(Continued)

FOREIGN PATENT DOCUMENTS

| | | |
|---|---|---|
| EP | 1365320 A1 | 11/2003 |
| EP | 1715419 A1 | 10/2006 |

OTHER PUBLICATIONS

NPL—An Approach to Automatically Generated Model Transformations Using Ontology Engineering Space—Sep. 20, 2006—(Stephan Roser, Bernhard Bauer—Programming of Distributed Systems, Institute of Computer Science, University of Augsburg, Germany.*

(Continued)

*Primary Examiner* — Lewis A Bullock, Jr.
*Assistant Examiner* — Francisco Aponte
(74) *Attorney, Agent, or Firm* — A. Bruce Clay

(57) ABSTRACT

A transformation tool and a validation tool are used to verify programmable artifacts, such as Java models, that are generated from an original ontology model. The verification process ensures that the programmable artifacts are semantically equivalent to the original ontology model from which they are created. Each element in the programmable artifacts is tagged with appropriate metadata, using, for example, Java language annotation support. Once tagged, the programmable artifacts can be parsed to form a generated ontology model. This generated ontology model can then be compared to the original ontology model with a validation tool, in order to verify their semantic equivalence.

9 Claims, 7 Drawing Sheets

(56) References Cited

U.S. PATENT DOCUMENTS

| | | | | |
|---|---|---|---|---|
| 2006/0064666 | A1* | 3/2006 | Amaru et al. | 717/100 |
| 2006/0130011 | A1* | 6/2006 | Cornell et al. | 717/136 |
| 2006/0242195 | A1* | 10/2006 | Bove et al. | 707/103 R |
| 2007/0006132 | A1* | 1/2007 | Weinstein et al. | 717/104 |
| 2007/0112718 | A1* | 5/2007 | Liu et al. | 706/47 |
| 2007/0294704 | A1* | 12/2007 | Stephen et al. | 719/315 |
| 2008/0071731 | A1* | 3/2008 | Ma et al. | 707/2 |
| 2008/0178164 | A1* | 7/2008 | Brown et al. | 717/144 |
| 2008/0181516 | A1* | 7/2008 | Jackson | 382/236 |
| 2008/0276229 | A1* | 11/2008 | Hawkins et al. | 717/136 |
| 2008/0295068 | A1* | 11/2008 | Kendall et al. | 717/104 |
| 2008/0312898 | A1* | 12/2008 | Cleary et al. | 703/21 |
| 2009/0037884 | A1 | 2/2009 | Benameur et al. | |
| 2009/0063522 | A1* | 3/2009 | Fay et al. | 707/100 |
| 2009/0077094 | A1* | 3/2009 | Bodain | 707/10 |
| 2009/0077531 | A1* | 3/2009 | Miloslavsky et al. | 717/100 |
| 2010/0005122 | A1* | 1/2010 | Jackson | 707/104.1 |
| 2010/0031240 | A1* | 2/2010 | Drumm et al. | 717/143 |
| 2010/0064275 | A1* | 3/2010 | Akkiraju et al. | 717/104 |
| 2010/0077386 | A1* | 3/2010 | Akkiraju et al. | 717/136 |
| 2010/0175054 | A1* | 7/2010 | Matusikova et al. | 717/136 |
| 2010/0228782 | A1* | 9/2010 | Rao et al. | 707/794 |
| 2011/0087625 | A1* | 4/2011 | Tanner et al. | 706/12 |
| 2011/0208788 | A1* | 8/2011 | Heller et al. | 707/810 |

OTHER PUBLICATIONS

NPL—Semantic Business Process Modeling—Benefits and Capability—Jan. 23, 2008—(Florian Lautenbacher, Bernhard Bauer, Christian Seitz—Programming Distributed Systems Lab University of Augsburg, Germany.*

A Taxonomy of Model Transformation—Tom Mens, Pieter Van Gorp—Electronic Notes in Theoretical Computer Science 152 (2006) 125-142.*

An Approach to Automatically Generated Model Transformations Using Ontology Engineering Space—Stephan Roser, Bernhard Bauer Programming of Distributed Systems, Institute of Computer Science, University of Augsburg—2006.*

Ontology Evolution and Versioning The state of the art Burcu Yildiz Vienna University of Technology Institute of Software Technology & Interactive Systems (ISIS) Asgaard-TR-2006-3 Oct. 2006.*

Ontology-based modeling of dynamic ubiquitous computing applications as evolving activity spheres Lambrini Seremeti, Christos Goumopoulosa, Achilles Kameasa—Pervasive and Mobile Computing 5 (2009).*

Semantic Business Process Modeling—Benefits and Capability Florian Lautenbacher, Bernhard Bauer, Christian Seitz Programming Distributed Systems Lab 2008 University of Augsburg, Germany 2008.*

J. Blech et al., "Formal Verification of Java Code Generation From UML Models", Proceedings of the 3rd International Fujaba Days, 2005, "MDD in Practice".

A. Giorgetti et al., "Verification of Class Liveness Properties With Java Modelling Language", Software, IET, Dec. 2008, vol. 2, Issue 6, pp. 500-514.

L. Yu et al., "Ontology Model-Based Static Analysis on Java Programs", 2008 32nd Annual IEEE International Computer Software and Applications Conference, pp. 92-99.

M. Lohmann et al., "Executable Visual Contracts", Proceedings of the 2005 IEEE Symposium on Visual Languages and Human-Centric Computing, pp. 1-8.

J. Groslambert et al., "JML-Based Verification of Liveness Properties on a Class in Isolation", Fifth International Workshop on Specification and Verification of Component-Based Systems, Nov. 10-11, 2006, pp. 41-48.

R. Valverde, "The Ontological Evaluation of the Requirements Model When Shifting From a Traditional to a Component-Based Paradigm in Information Systems Re-Engineering", Dissertation Submitted to University of Southern Queensland, pp. 1-209, 2008.

* cited by examiner

VERIFYING PROGRAMMING ARTIFACTS GENERATED FROM ONTOLOGY ARTIFACTS OR MODELS

BACKGROUND

The present invention relates, in general, to verifying programming artifacts, and more specifically to verifying programming artifacts generated from ontology artifacts or models.

In computer science, ontology is a model, i.e., a formal representation by a set of concepts within a domain and the relationships between those concepts. An ontology model includes a representation of entities and ideas along with their properties and relations, according to a system of categories. For example, a Java model for Java applications can be generated from an ontology model. In order to determine if the Java model is comparable semantically to the ontology model, it is necessary to manually verify by looking at both models, which is likely to be error prone.

BRIEF SUMMARY

According to one embodiment of the present invention, a method for verifying artifacts created from an original ontology model, comprises creating an annotation framework to represent an ontology taxonomy. The ontology model is transformed into programmable artifacts using the annotation framework. The programmable artifacts are compared, using a processor, with the original ontology model in order to verify the artifacts.

According to one embodiment of the present invention, a computer program product verifies artifacts created from an original ontology model. The computer program product comprises a computer readable storage medium having computer readable program code embodied therewith. The computer readable program code is configured to create an annotation framework to represent an ontology taxonomy. The computer readable program code is configured to transform the ontology model into programmable artifacts using the annotation framework. The computer readable program code is configured to compare the programmable artifacts with the original ontology model in order to verify the artifacts.

According to one embodiment of the present invention, a computer system for verifying artifacts created from an original ontology model, comprises a processor and a memory connected to the processor, wherein the memory is encoded with instructions and wherein the instructions when executed comprise instructions for creating an annotation framework to represent ontology taxonomy, instructions for transforming the ontology model into programmable artifacts using said annotation framework, and instructions for comparing, using a processor, the programmable artifacts with the original ontology model in order to verify the artifacts.

DETAILED DESCRIPTION

Figure 1:
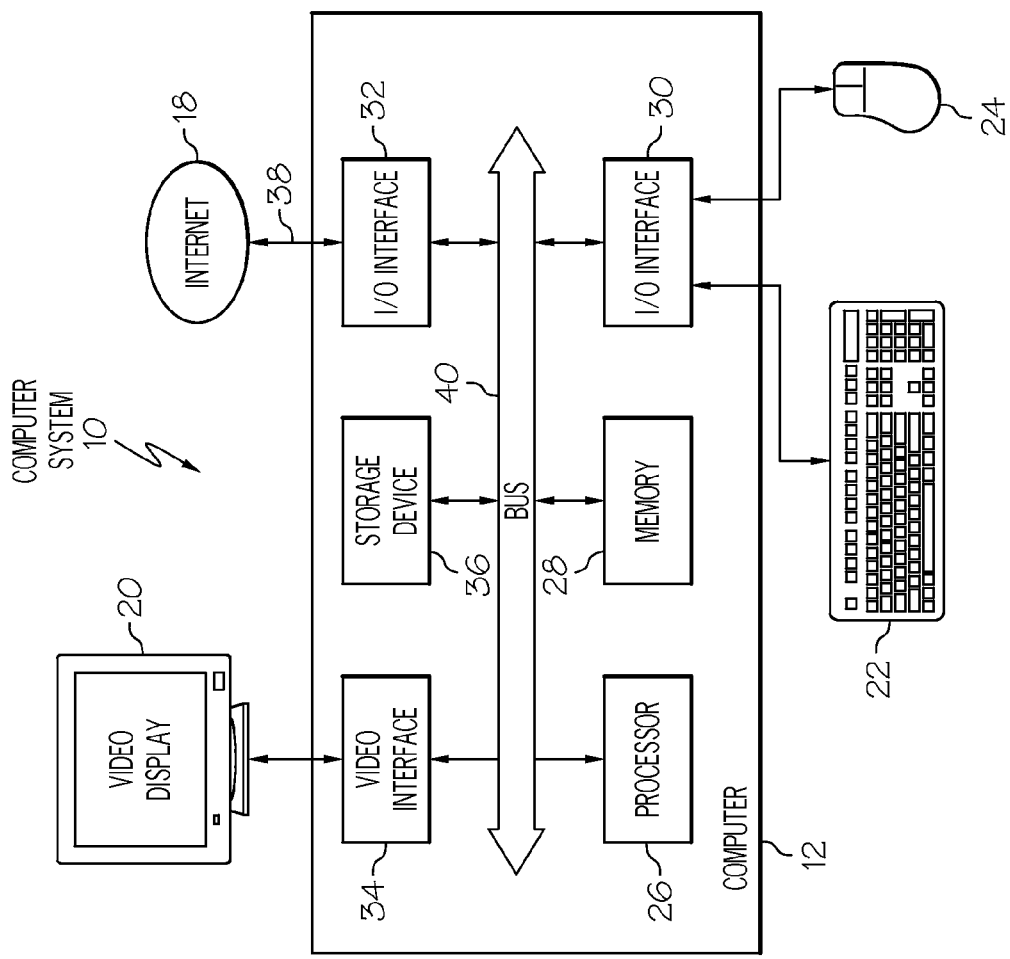
FIG. 1 is an illustration of one example of a computer system suitable for executing computer software in accordance with one embodiment of the invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for verifying programming artifacts generated from ontology artifacts or models in accordance with the techniques described. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10, and may be thought of as comprising software code for verifying programming artifacts generated from ontology artifacts or models. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

One embodiment of the invention verifies, with a transformation tool and a validation tool, programmable artifacts, such as Java models, generated from ontology models. This is particularly useful when there is a large ontology model available that is based on industry standards such as ACORD and HIPAA, and the desire is to generate Java models that can be subsequently verified as semantically equivalent to each other. With the Java language providing annotation support, each element in a Java artifact, especially the class/interface and/or method definitions can be tagged with appropriate metadata. Such an annotated Java model can then be parsed to recreate an ontology model, either as an in-memory model or a file, and then compared with the original model.

Figure 2:
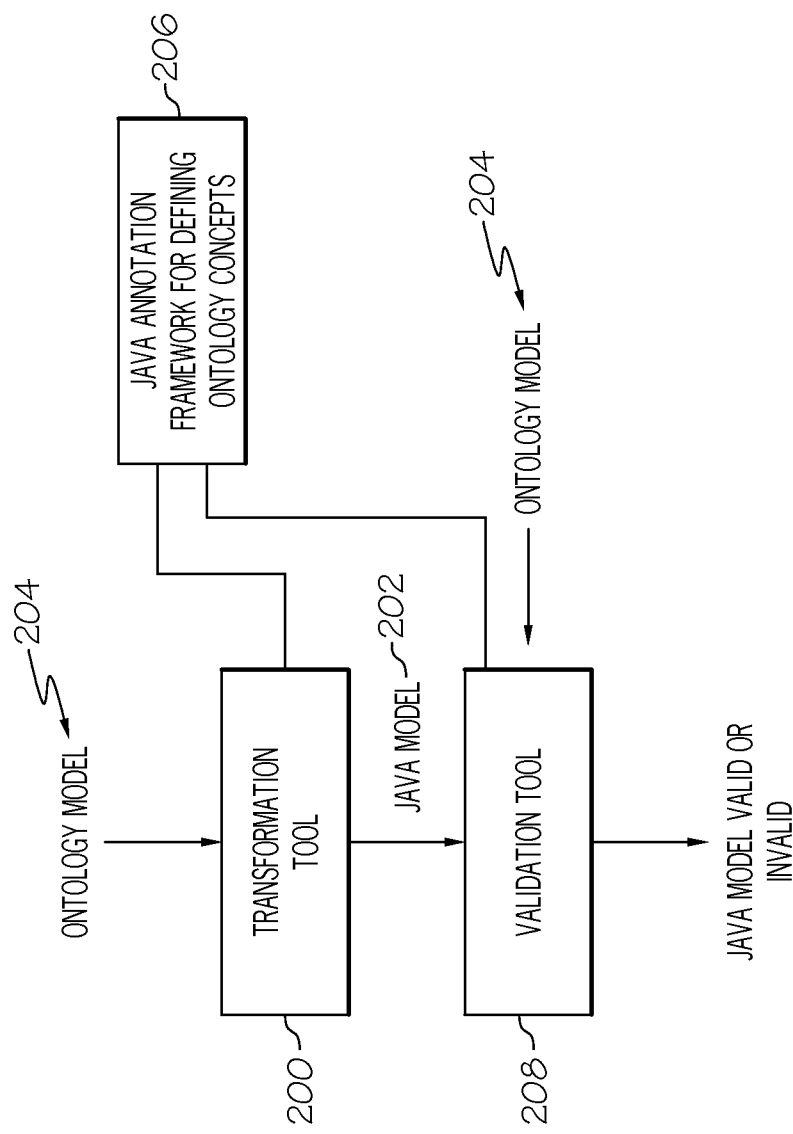
FIG. 2 is a high level flowchart illustrating an embodiment of the present invention.

With reference now to FIG. 2, a high level flowchart illustrates an overview of one embodiment of the present invention in which a transformation tool 200 creates, from an ontology model 204, programmable artifacts, such as a Java model 202. While the embodiment described herein uses a Java model, it is to be understood that any programming artifact may be used, such as, for example, Perl or C#. Initially, annotation framework 206, representing ontology taxonomy, for example, class or property, is created. As will be subsequently described in greater detail, a validation tool 208 determines whether the Java model 202 is valid or invalid by comparing it to the original ontology model 204. The validation tool 208 may use a processor 26, such as is found in the computer 12 of FIG. 1, to perform this comparison. The annotation framework is used to add meta information to a Java class (methods and properties). The meta information herein is derived from the ontology specification.

Figure 3:
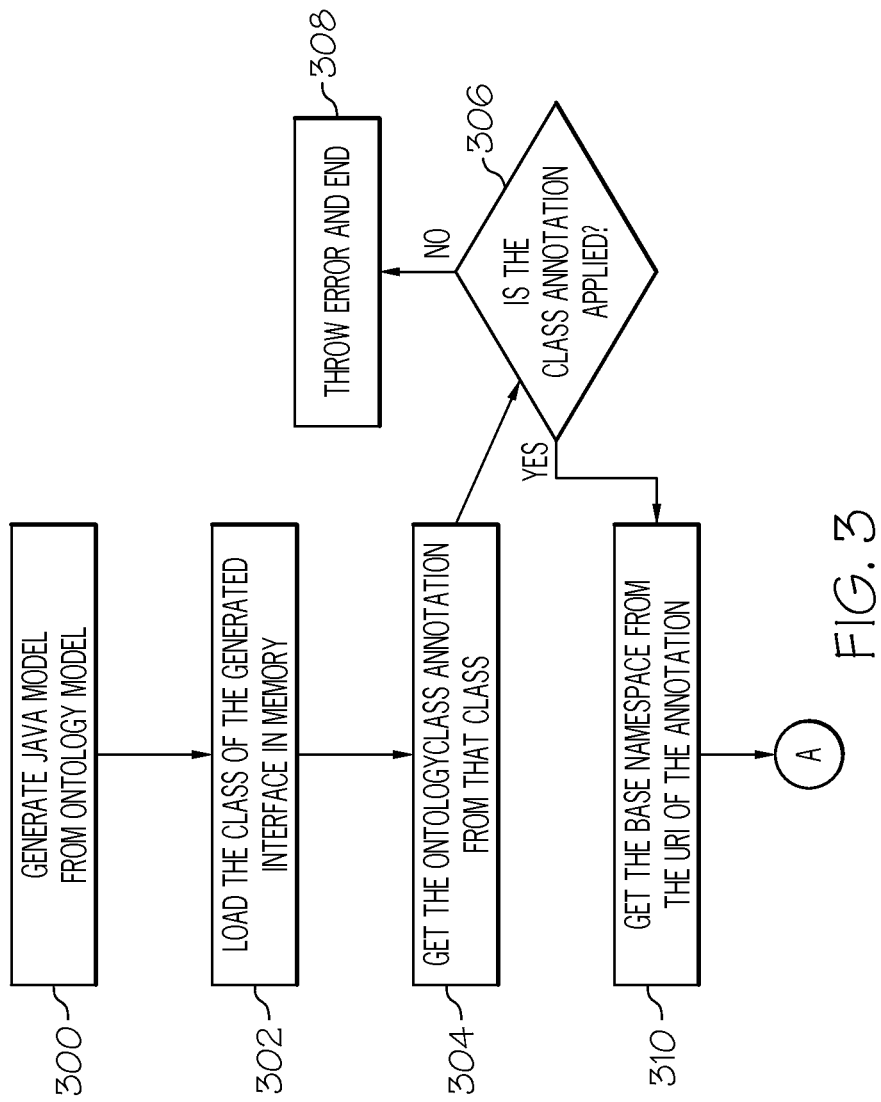
FIGS. 3, 4, 5, 6, and 7 are flowcharts illustrating, in greater detail, an embodiment of the present invention.

Referring now to FIG. 3, at block 300, a Java model (or any other programming artifact) is generated from an ontology model. One embodiment of the present invention uses stereotypes from the Unified Modeling Language (UML (an Object Management Group (OMG) specification)). UML is the most used and best known language to model application structure, behavior and architecture, as well as business processes and data structures. The stereotypes are semantically the same as the annotation framework (Java). As is known in the art, stereotyping is one of three types of extensibility mechanisms in the UML. Stereotyping allows designers to extend the vocabulary of UML in order to create new model elements, derived from existing ones but having specific properties that are suitable for a particular problem domain or otherwise special usage. The UML stereotypes are used herein to classify a UML element as an ontology concept or terminology. A transformation is then applied to create a Java model.

Figure 8:
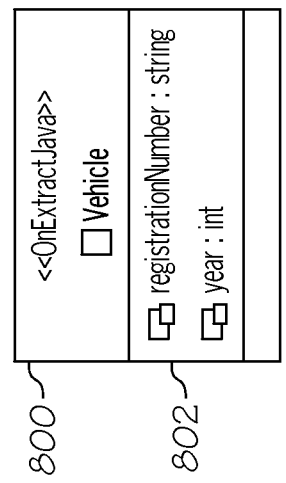
FIG. 8 is an illustration of the application of stereotypes.

The following, in conjunction with FIG. 8, illustrates how stereotypes can be applied to UML models. The transformation tool 200 (FIG. 2), in accordance with an embodiment of the present invention, generates Java interfaces from the UML model with required annotations. The required annotations provide mapping from and to the ontology model. For each property in the ontology model, an annotation would be put into the Java model. For example, a class Vehicle 800 having a property "registrationNumber" of type string 802 may comprise:

```
@OntologyClass(uri = " http://www.xxx.com/vehicle#Vehicle ")
public interface IVehicle extends IThing {
@OntologyProperty(uri =
" http://www.xxx.com/vehicle#registrationNumber ")
void setRegistrationNumber(String registrationNumber);
```

This annotation would then be applied to the Java model.

Next, the validation tool 208 (FIG. 2) generates an OWL model from the Java interfaces created above. OWL (Web Ontology language) is the most expressive language for representing and sharing ontologies over the Web. OWL is designed for use by applications that need to process the content of information instead of just presenting information. It facilitates greater machine interoperability of Web content than other description languages like XML, RDF and RDF-S by providing additional vocabulary along with formal semantics. The validation tool validates the generated OWL model against the original OWL model. The OWL model is the source model from which the Java interfaces were generated. The Source OWL model as used herein can be any user defined OWL model or an OWL model which is available on the internet.

Returning to FIG. 3, the methodology to generate an OWL model from Java interfaces continues at block 302 where the class of the generated interface is loaded into memory, such as the memory 28 in computer 12 of FIG. 1. At block 304 the OntologyClass annotation from that class is obtained. At decision block 306, it is determined whether the class annotation was applied. If the response to decision block 306 is no, an error is thrown and the process ends at block 308. If the response to decision block 306 is yes, the base namespace (one of the properties of class annotation extracted by the validation tool 208) is obtained from the URI of the annotation at block 310, and the process continues to FIG. 4.

Figure 4:
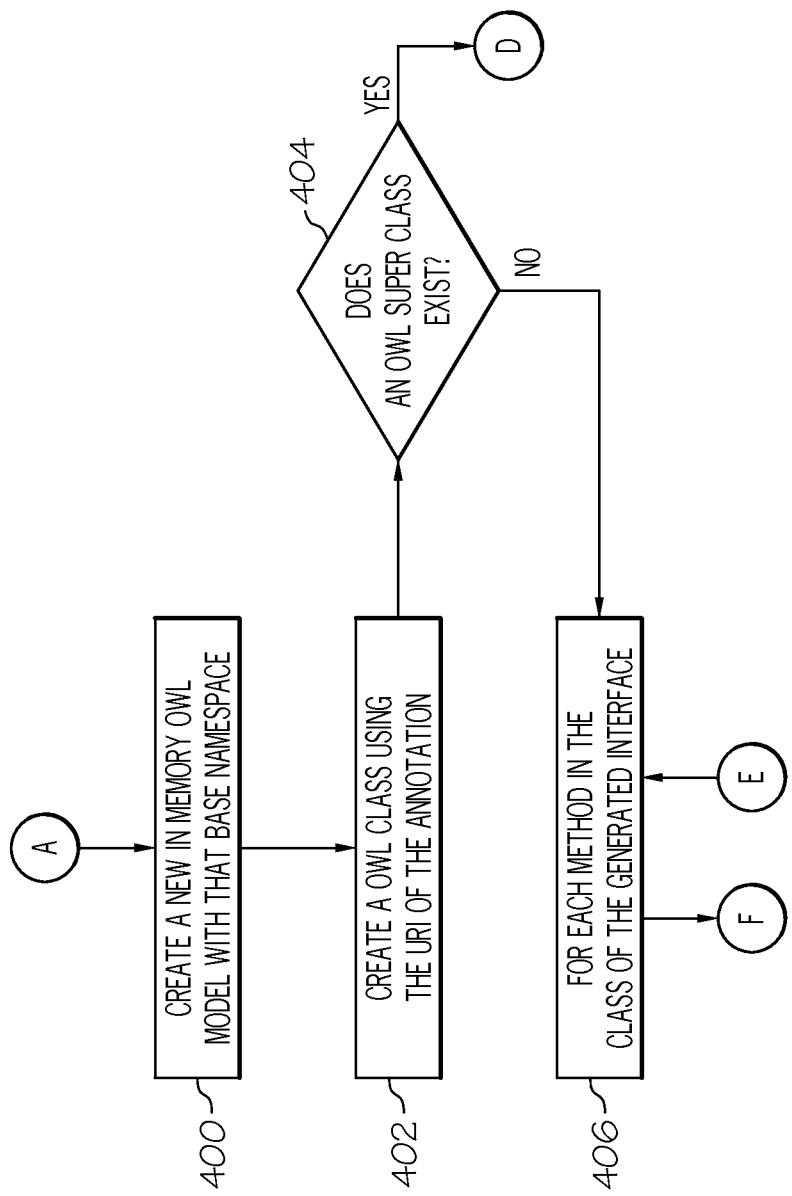

Referring now to FIG. 4, the process continues at block 400 wherein a blank (no information is yet added to the file) OWL model is created using the above indicated base namespace, for example, as shown below:

```
<?xml version="1.0" encoding="UTF-8"?><!DOCTYPE rdf:RDF [<!ENTITY xsd ""
title="http://www.w3.org/2001/XMLSchema#">"
class="link">http://www.w3.org/2001/XMLSchema#">] ><rdf:RDF
xmlns:rdfs="http://www.w3.org/2000/01/rdf-schema#"
xmlns:owl="http://www.w3.org/2002/07/owl#" xmins:rdf="http://www.w3.org/1999/02/22-
rdf-syntax-ns#" xml:base="http://www.ibm.com/vehicle"></rdf:RDF>
```

At block 402, the OWL class corresponding to the interface is created programmatically in memory. It is then determined at decision block 404, if an OWL super class exists. If the response to decision block 404 is yes, the method proceeds to block 600 of FIG. 6.

Figure 6:
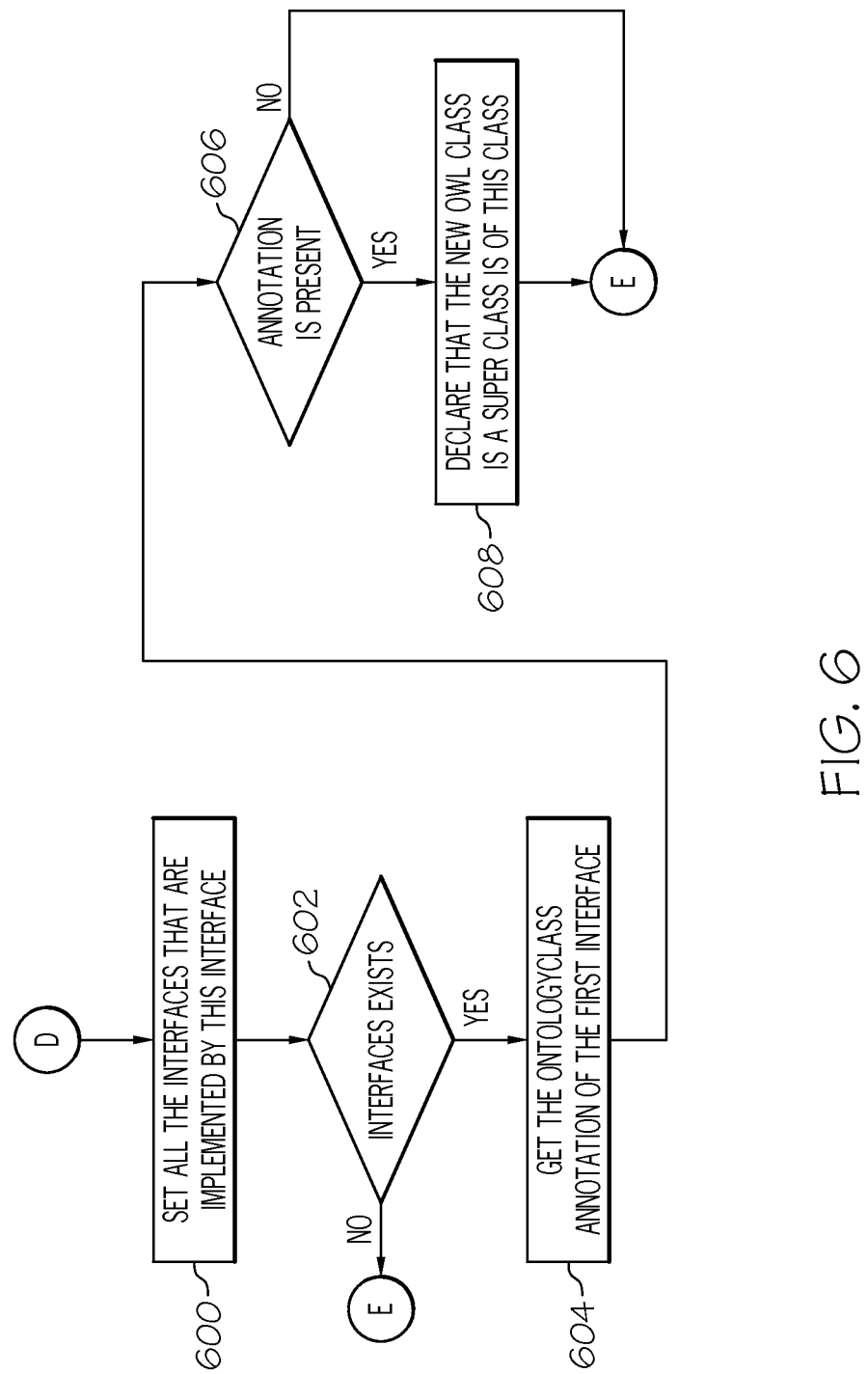

At block 600 of FIG. 6, the interfaces that are extended by this Java interface are obtained. At decision block 602, it is determined if interfaces exist. If the response to decision block 602 is no, the process returns to block 406 in FIG. 4. If the response to decision block 602 is yes, the OntologyClass Annotation of the first interface is obtained at block 604.

It is then determined at decision block 606 if the annotation is present. If it is determined at decision block 606 that the annotation is not present, the process returns to block 406 in FIG. 4. If it is determined at decision block 606 that the annotation is present on the Java interface, the corresponding OWL class is defined to be a super class at block 608. For example, in the original OWL model, a class X is declared to be a super class of class Y. For the generated OWL model to match with the original OWL model, the class X has to be declared as super class of the class Y (one of the code generation paths of a super class). Similarly, a code generation path exists for other OWL elements. However, for this embodiment, only a super class is used as an example. The corresponding OWL model is derived from the annotations defined on the Java interfaces. The process then returns to block 406 of FIG. 4.

Returning to FIG. 4, if the response to decision block 404 is no, the process proceeds to block 406. At block 406, for every method in the class of the generated interface, the process proceeds to decision block 500 of FIG. 5.

Figure 5:
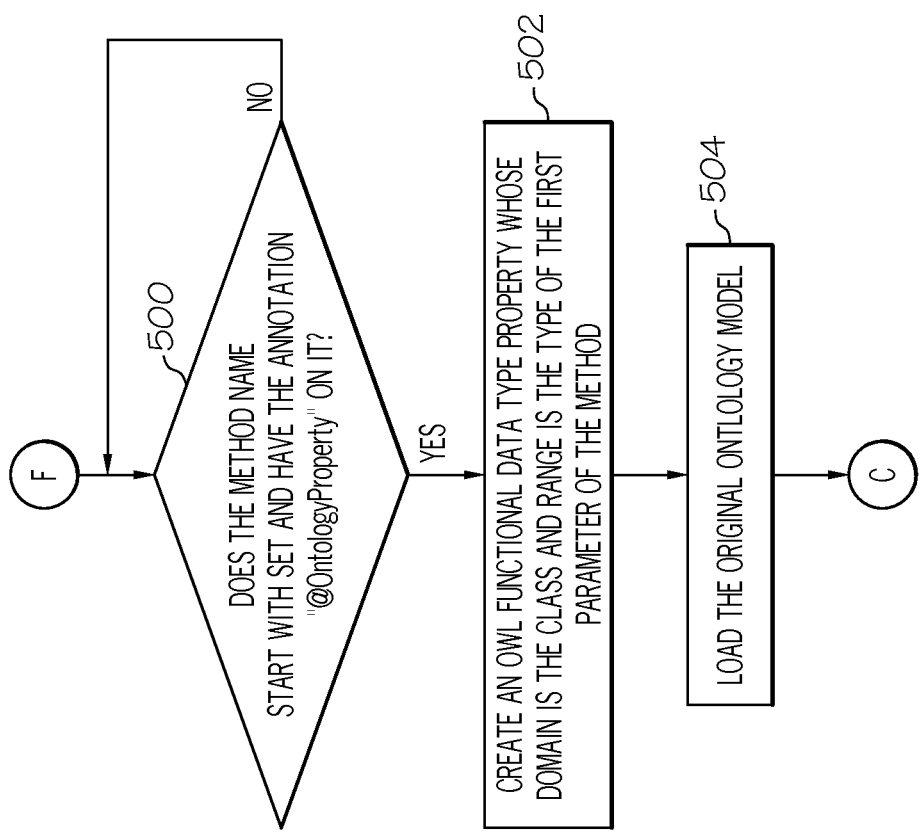

It is determined at decision block 500 of FIG. 5, for every method in the class of the interface, if the name of the Java method starts with "set" and has the annotation named "@OntologyProperty" on it. If the response to decision block 500 is no, the process loops back to block 500 for the next method in the class of the generated interface. If the response to decision block 500 is yes, at block 502 an OWL functional data type property, whose domain is the class and range is the type of the first parameter of the method, is created. This process is defined as:

---

If the name of the method starts with "set"
   Get the property annotation.
   If no such annotation is applied or if the property is one of
   label, comment, version
info
      Continue with the next method (loop back to 500).
    Get the parameter types of the method.
    If the number of parameters is not equal to 1:
      Continue with the next method.
    Generate the triples needed to define the property in the OWL model.
    Write the OWL model to the file.

---

Figure 7:
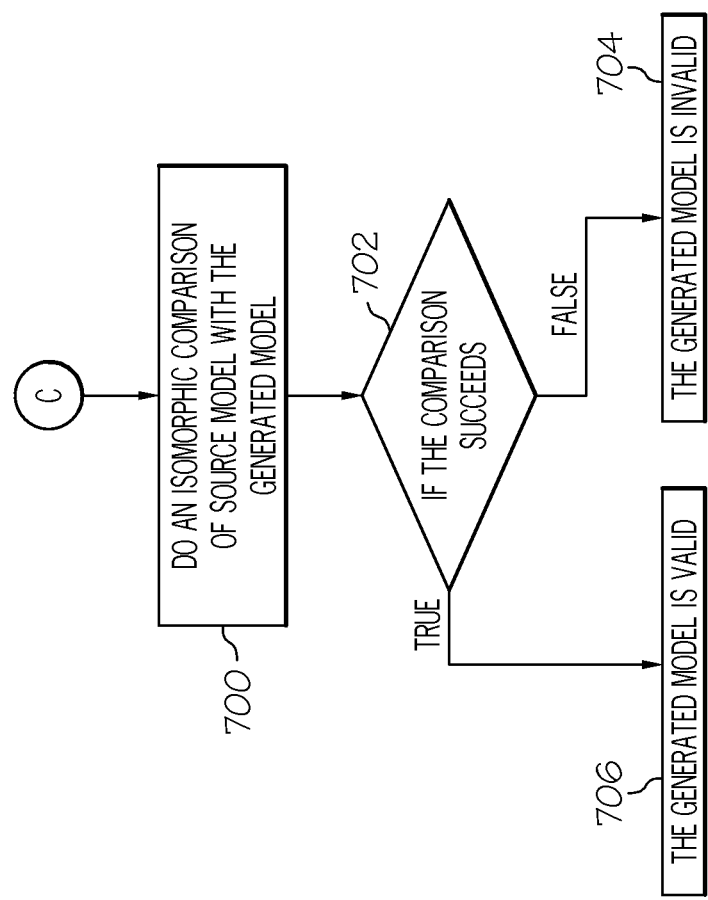

At block 504, the original Ontology model is loaded, and the process then proceeds to block 700 of FIG. 7. At block 700, an isomorphic comparison of a source model to a generated model is conducted, for example, by the processor 26 of the computer 12 (FIG. 1). It is determined at decision block 702 if the comparison succeeds. If the response to decision block 702 is true, then the generated model is valid at block 706. However, if the response to decision block 702 is false, then the generated model is invalid at block 704.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of verifying artifacts created from an original source ontology model, comprising:
creating an annotation framework to represent ontology taxonomy, wherein for each property in the original source ontology model an annotation is inserted into a programmable artifact, said programmable artifact further comprising a java model;
transforming the original source ontology model into said programmable artifact using said annotation framework, said annotation framework mapping from the original source ontology model to said programmable artifact and to the original source ontology model from said programmable artifact, wherein said transforming the original source ontology model is executed by utilizing stereotypes from Uniform Modeling Language as a type of extensibility mechanism;
parsing said annotated java model to create a generated ontology model as semantically equivalent to the original source ontology model;
conducting, using a processor, an isomorphic comparison of said generated ontology model to the original source ontology model to verify semantic equivalency of said generated ontology model and the original source ontology model.

2. The method of claim 1, wherein said transforming the original source ontology model into said programmable artifact further comprises tagging each class, interface, and method definition with metadata.

3. The method of claim 1, further comprising storing said generated ontology model in a memory.

4. A computer program product for verifying artifacts created from an original source ontology model, the computer program product comprising a non-transitory computer readable storage medium having computer readable program code embodied therewith, the computer readable program code comprising:
computer readable program code configured to create an annotation framework to represent ontology taxonomy, wherein for each property in the original source ontology model an annotation is inserted into a programmable artifact, said programmable artifact further comprising a java model;
computer readable program code configured to transform the original source ontology model into said programmable artifact using said annotation framework, said annotation framework mapping from the original source ontology model to said programmable artifact and to the original source ontology model from said programmable artifact, wherein said computer readable program code configured to transform the original source ontology model is executed by utilizing stereotypes from Uniform Modeling Language as a type of extensibility mechanism;
computer readable program code configured to parse said annotated java model to create a generated ontology model as semantically equivalent to the original source ontology model; and
computer readable program code configured to conduct an isomorphic comparison of said generated ontology model to the original source ontology model to verify semantic equivalency of said generated ontology model and the original source ontology model.

5. The computer program product of claim 4, wherein said transforming the original source ontology model into said programmable artifact further comprises computer readable program code configured to tag each class, interface, and method definition with metadata.

6. The computer program product of claim 4, further comprising computer readable program code configured to store said generated ontology model in a memory.

7. A computer system for verifying artifacts created from an original source ontology model, comprising:
a processor; and
a memory connected to the processor, wherein the memory is encoded with instructions and
wherein the instructions when executed comprise: instructions for creating an annotation framework to represent ontology taxonomy, wherein for each property in the original source ontology model an annotation is inserted into a programmable artifact, said programmable artifact further comprising a java model;

instructions for transforming the original source ontology model into said programmable artifact using said annotation framework, said annotation framework mapping from the original source ontology model to said programmable artifact and to the original source ontology model from said programmable artifact, wherein the instructions for transforming the original ontology model are executed by utilizing stereotypes from Uniform Modeling Language as a type of extensibility mechanism;

instructions for parsing said annotated java model to create a generated ontology model as semantically equivalent to the original source ontology model; and instructions for conducting an isomorphic comparison of said generated ontology model to the original source ontology model to verify semantic equivalency of said generated ontology model and the original source ontology model.

8. The computer system of claim 7, wherein said instructions for transforming the original source ontology model into said programmable artifact further comprises instructions for tagging each class, interface, and method definition with metadata.

9. The method of claim 7, further comprising instructions for storing said generated ontology model in a memory.

* * * * *